United States Patent [19]

Brugger et al.

[11] Patent Number: 4,613,214

[45] Date of Patent: Sep. 23, 1986

[54] OPTICAL DEVICE FOR VIEWING THE ADJUSTMENT OF OPTICAL WAVEGUIDES

[75] Inventors: Rudolf Brugger, Puchheim; Gerhard Jonke, Gilching; Peter Steinmann, Deisenhofen, all of Fed. Rep. of Germany

[73] Assignee: Siemens Aktiengesellschaft, Berlin & Munich, Fed. Rep. of Germany

[21] Appl. No.: 636,927

[22] Filed: Aug. 2, 1984

[30] Foreign Application Priority Data

Sep. 30, 1983 [DE] Fed. Rep. of Germany ....... 3335579

[51] Int. Cl.⁴ .................. G02B 6/24; G02B 21/18; G02B 21/06
[52] U.S. Cl. .......................... 350/511; 350/526; 350/96.21; 356/153; 356/73.1
[58] Field of Search ............... 350/511, 512, 508, 507, 350/502, 96.21, 96.20, 526; 356/73.1, 153

[56] References Cited

U.S. PATENT DOCUMENTS 4,474,469 10/1984 Abe ........................... 356/153

4,506,947 3/1985 Tatekura et al. ............... 350/96.21

FOREIGN PATENT DOCUMENTS 27426 11/1969 Japan ........................ 350/511

Primary Examiner—Jon W. Henry
Attorney, Agent, or Firm—Hill, Van Santen, Steadman & Simpson

[57] ABSTRACT

A device for observing the ends of optical waveguides, which ends are being adjusted relative to each other for splicing purposes, characterized by two separate microscopes arranged to view adjustments along two perpendicularly extending directions. Each of the microscopes has a mirror arrangement for bending the optical paths onto a common intermediate image plane and the microscopes have a common eyepiece for observing the common intermediate image plane so that adjustments along both directions can be observed without changing eyepieces. Preferably, a diaphragm is provided to be alternately moved into the path of one microscope to block the vision while observing the view of the other microscope.

12 Claims, 10 Drawing Figures

OPTICAL DEVICE FOR VIEWING THE ADJUSTMENT OF OPTICAL WAVEGUIDES

BACKGROUND OF THE INVENTION

The present invention is directed to an optical device for observing the ends of optical waveguides which are being adjusted relative to one another for splicing purposes, in particular, for observing the ends of monomode optical waveguides through a microscope.

An optical device for observing the ends of optical waveguides, which are being spliced, is disclosed in U.S. patent application Ser. No. 558,878, which claims priority from German application No. P 32 45 229. With the aid of this optical device or installation, which is integrated into a thermal optical waveguide fusing or splicing apparatus, the alignment of the ends of the waveguides, which are to be fused together in a longitudinal direction, can be observed. Since the optical waveguides are centered in aligned V-shaped grooves, the alignment in the transverse direction is not necessary. The optical installation itself consists of an illumination device, a lens, which images the splicing location via two deflection mirrors, which are arranged in the optical path, on a ground glass screen and of a magnifier through which the image produced on the ground glass screen is viewed and enlarged once again. Through the optical device constructed in this fashion, it is then possible in addition to the alignment of the optical waveguides in a longitudinal direction to also monitor the fusing operation in a comprehensive manner from the beginning to the end.

In addition to an alignment of the ends of the optical waveguides in a longitudinal direction, which ends are to be spliced to one another, an alignment through rotation of the optical waveguides and an alignment in two transverse directions which are perpendicular to one another can be necessary. For example, optical waveguides with fracture surfaces which extend obliquely relative to the respective longitudinal axis must be aligned to as small as possible gap or slit spacing by rotating one of the optical waveguides about its longitudinal axis. Otherwise, a relatively high splicing attenuation will result after splicing if the two end faces have not been rotated to provide the smallest gap therebetween. In the case of monomode optical waveguides whose cores exhibit very small dimensions in the order of magnitude of approximately 10 um and are eccentrically positioned in the waveguide, a possible considerable splicing attenuation will result. Therefore, in the case of monomode optical waveguides of this type, a rotation of the optical waveguide about its longitudinal axis and through an adjustment of the two transverse directions which are perpendicular to one another, an adjustment must be attained in which the core region of the optical waveguides are in precise alignment. Accordingly, an observation of this adjustment operation must proceed from two transverse directions which are perpendicular to one another. However, the optical installation proposed in the above-mentioned patent application is not suited for this purpose since it permits only an observation of the splicing location from one transverse direction.

SUMMARY OF THE INVENTION

The object of the present invention consists in providing an optical device for the observation of the adjustment of optical waveguides which permits an observation of the splicing location from two transverse directions which are perpendicular to one another. This is accomplished by an optical device having a first microscope with its optical axis extending along one of the axes, a second microscope with its optical path extending along the other axis perpendicular to the first axis and intersecting the path of the first optical axis at an object plane for the point of observation, means acting on at least one of the optical paths of the first and second microscope at a point spaced from the intersecting point to bring the two paths of the two microscopes to a common intermediate image plane and a common eyepiece for observing the common intermediate image plane so that both perpendicularly extending directions can be observed through the common eyepiece.

The theory underlying the present invention consists in the knowledge that the observation of the splicing location from two transverse directions, which are perpendicular to one another, through two entirely separate microscopes with two eyepieces would considerably obstruct and complicate the adjustment operation. However, in the case of an observation through a common eyepiece, the eye can remain on the eyepiece during the entire adjustment operation. Moreover, through a common eyepiece, a lower construction outlay will occur.

According to a further embodiment of the invention, the microscopes possess illumination devices in the optical axes, whose light sources are alternately capable of being switched on. For the observation direction with the switched-on light source, a sharp image will occur whereas the observation direction with the shut-off light source, only a weak image will appear. In this manner, alternately and corresponding to the respective requirements of the adjustment operation, sharp images of both observation directions can be produced.

A particularly advantageous modification of the invention is characterized in that at least one diaphragm is capable of being alternately inserted in the separate optical paths of the two microscopes. Through this diaphragm, the weak image of the respective other observation direction is then entirely eliminated while a sharp and undisturbed image of the splicing location from the selected direction can occur.

A further preferred embodiment of the invention provides that in the optical paths of both microscopes between the object plane and the objective, additional means for bending the optical path such as a mirror is inserted. By this mirror, the optical axes of both microscopes, which initially extend perpendicular to one another, are adjusted to be in parallel paths so that a particularly compact construction of the optical installation is possible. In the same manner, it is advantageous if an additional mirror is provided so that the parallel extending paths are each bent to produce the common intermediate image plane. This additional mirror renders it possible to provide a space-saving by bringing the two optical axes into a common intermediate image plane.

An automatic switching to the image necessary for the respective adjustment operation results in accordance with another embodiment of the invention in that with a shifting of the optical waveguide in one of the two observation directions automatically an insertion of a diaphragm in the optical path of the microscope associated with the other observation direction is provided.

Finally, in the case of the additionally preferred embodiment of the invention, it is provided that at the level of the intermediate image plane, two tips are arranged which are disposed opposite one another and which simulate the electrode tips of the fusing device. In the case of the optical installation integrated in a thermal optical waveguide fusing apparatus, the respective position and alignment of the splicing location in relation to the electrode tips can thus also be observed.

DESCRIPTION OF THE PREFERRED EMBODIMENTS

Figure 1:
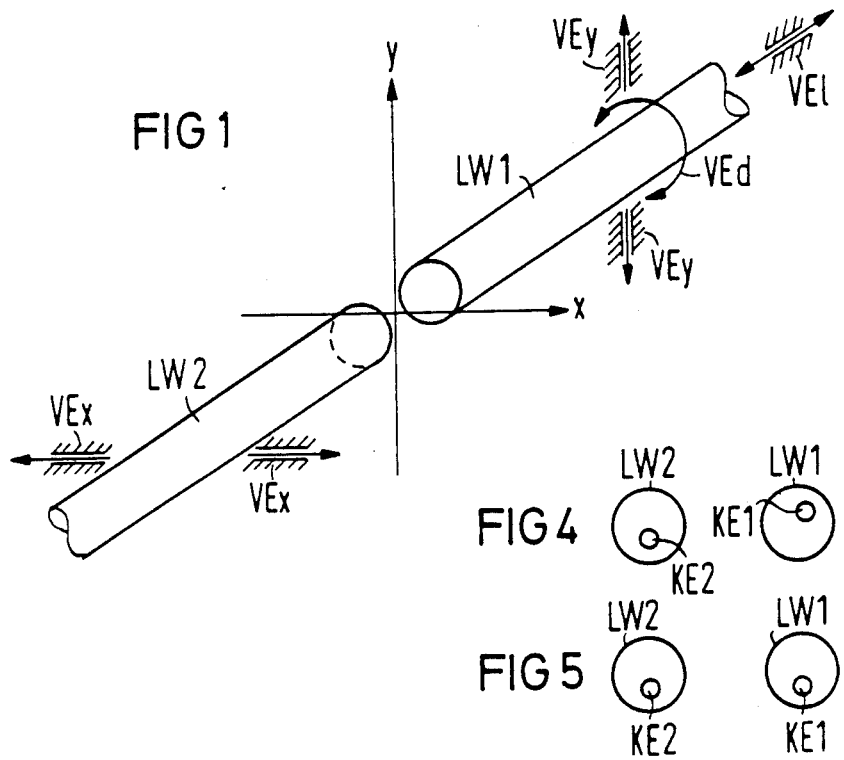
FIG. 1 is a perspective view diagrammatically illustrating the various adjustment movements necessary to obtain a precise adjustment of two waveguides.

As illustrated in FIG. 1, two optical waveguides LW1 and LW2 are positioned to be spliced together such as by a fusion splicing or by cementing or the like. As reference systems for the adjustment of the ends, there is illustrated between the two end faces of the optical waveguides LW1 and LW2 a planar Cartesian coordinate system with x and y axes. For the adjustment operation, three shifts and one rotation are necessary and the corresponding adjustment devices are purely schematically illustrated in the Figure only by arrows. An adjustment device VEx associated with the optical waveguide LW2 renders possible a shifting of the optical waveguide LW2 in the x direction. In a similar manner, the waveguide LW1 can be adjusted in the y direction by an adjustment device VEy. The waveguide LW1 can be rotated on its axis by a rotation adjustment device VEd and it can be shifted along its longitudinal axis by an adjustment device VE1.

Figure 2:
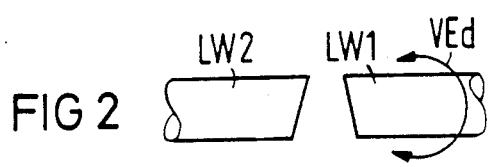
FIG. 2 is a diagrammatic side view of two waveguides in a non-aligned state with an unfavorable position of the fractured end surfaces.
Figure 3:
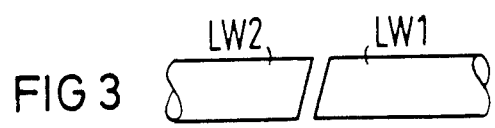
FIG. 3 is a side view of the two waveguides of FIG. 2 with the fractured end surfaces aligned in a satisfactory manner.

In FIG. 2, two optical waveguides LW1 and LW2 are illustrated with fractured end surfaces that extend obliquely to the respective longitudinal axis. If the optical waveguides are spliced in the arrangement as illustrated in FIG. 2, a relatively high splicing attenuation will result. This is not the case when the optical waveguide LW1 is rotated with the aid of an adjustment device VEd about its longitudinal axis in such a fashion until the two end faces assume the position illustrated in FIG. 3 which exhibit as small as possible a splicing space. The adjustment in the longitudinal direction will then proceed utilizing the adjustment device VE1 as illustrated in FIG. 1.

Figure 4:
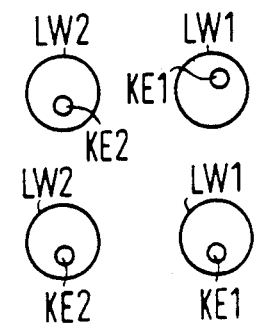
FIG. 4 is an end view of the two end surfaces of two waveguides such as in FIG. 1 having eccentrically positioned core regions which are out of alignment.
Figure 5:
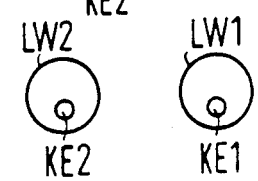
FIG. 5 is a diagrammatic view of FIG. 4 with the core regions being oriented in an aligned fashion.

In FIGS. 4 and 5, the light waveguide LW1 has a core region KE1 which is eccentrically disposed and the light waveguide LW2 has a core region KE2 which is also eccentrically located. Particularly in the case of monomode optical waveguides, these core regions have very small dimensions of the order of magnitude of approximately 10 μm and therefore given an eccentric position for the core regions KE1 and KE2 after splicing, a considerable splicing attenuation may possibly occur. In order to avoid this, the light waveguide LW1 is rotated with the aid of the adjustment device VEd about its longitudinal axis in such a fashion until according to FIG. 5 the respective core region KE1 coincides in the precise aligned fashion with the core region KE2 of the other waveguide LW2. In this manner, given two eccentric optical waveguides, the splicing attenuation can be considerably reduced which particularly in the case of small core regions of monomode optical waveguides has a consequence of considerably improving the attenuation values.

Figure 6:
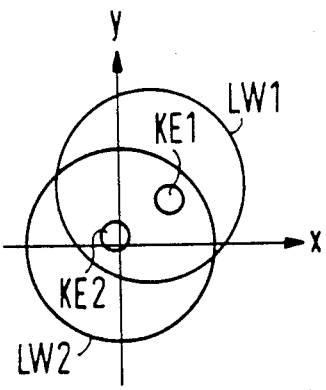
FIG. 6 is an end view of two waveguides which are offset relative to one another and exhibit various eccentric positions for the core regions.
Figure 7:
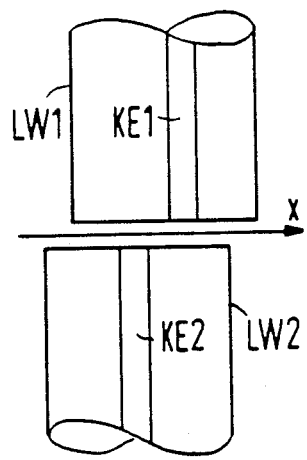
FIG. 7 is a side view taken along direction Y of the arrangement of FIG. 6.
Figure 8:
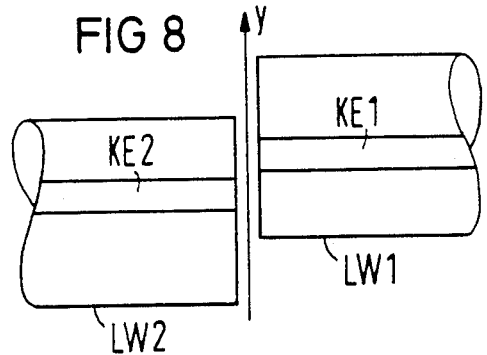
FIG. 8 is a side view taken along line X which is perpendicular to the direction of the view of FIG. 7.

In FIG. 6, two optical waveguides LW1 and LW2 are illustrated as being offset relative to one another in both the x direction and the y direction and each has a respective core region KE1 and KE2 which have different eccentricities. These two optical waveguides LW1 and LW2 must now be adjusted with the aid of the adjustment device such as VEx, VEy and VEd relative to one another in such a fashion that in the case of the smallest possible offset of the optical waveguides LW1 and LW2 in the x and y directions, optimum alignment of the two core regions KE1 and KE2 is guaranteed. In this adjustment operation, the splicing location must be observed along both the y direction and the x direction with the observation of the arrangement of waveguides in FIG. 6 in the y direction being illustrated in FIG. 7 and the observation in the x direction being illustrated in FIG. 8.

Figure 9:
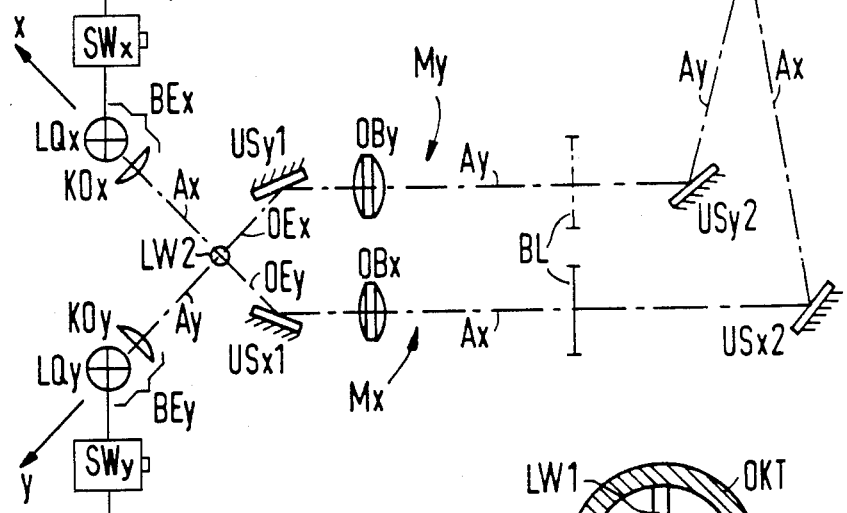
FIG. 9 is a schematic illustration of the device in accordance with the present invention which enables alternately observing the alignment of two waveguides from two perpendicular directions.

A device which enables the observation or viewing of the splicing location from both the x direction and the y direction is schematically illustrated in FIG. 9. It is noted that outer parts of the device are not illustrated and only the optics utilized in the device are shown. The splicing location has the optical waveguide such as LW1 and LW2 extending on an axis which is perpendicular to the plane of the drawing. At this location, only the waveguide LW2 is illustrated since it covers the waveguide LW1. The device consists essentially of two microscopes Mx and My which have a common intermediate image plane ZE and a common eyepiece OK. The microscope Mx has an illumination device BEx while the microscope My has an illumination device BEy.

The optical axis or path Ax of the microscope Mx is first aligned in the direction of the x axis. The illumination device BEx consists of a light source LQx with a switch SWx and a condenser KOx. The object plane OEx of the microscope Mx lies at the level of the y axis perpendicularly to the x axis. In the ray trace or path of the microscope Mx, behind the illumination device BEx and the object plane OEx, there are arranged, in succession, a mirror USx1, a lens or objective OBx and an additional mirror USx2. The mirrors USx1 and USx2 are arranged so that the splicing location, when viewed from the x direction, will be on the common intermediate image plane ZE and the enlarged real image is produced which can be observed once again through the common eyepiece OK as well as through a magnifier. Thus, with the aid of the microscope Mx, the adjustment in the y direction can be observed.

The optical axis Ay of the microscope My is first aligned in the direction of the y axis. The illumination device BEy consists of a light source LQy with a switch SWx and a condenser KOy. The object plane OEy of the microscope My is disposed at the level of the x axis perpendicular to the y axis. In the ray trace or path Ay of the microscope My behind the illumination device BEy and the object plane OEy, there are arranged in succession a mirror USy1, a lens OBy and an additional mirror USy2. The mirrors USy1 and USy2 are arranged so that the splicing location viewed from the y direction is projected on the common intermediate image plane ZE as an enlarged real image which can be observed again through the common eyepiece OK as well as through the magnifier. Thus, with the aid of the microscope My, the adjustments in the x direction can be observed. The path folding or bending mirrors USx1 and USy1 are so arranged that the optical paths Ax and Ay which were previously running perpendicular to one another extend parallel to each other until they strike the second mirror USx2 and USy2 and are projected on the common intermediate image plane ZE. A particularly compact construction of the entire optical installation or device is thus rendered possible by this feature.

The splicing location can be observed alternately during adjustment from the x direction and from the y direction. For this reason, a diaphragm BL is capable of being alternately inserted into the separate ray traces or paths of the two microscopes Mx and My. In the position illustrated with a heavy line, the diaphragm BL is disposed in the ray trace Ax of the microscope Mx between the lens or objective OBx and the second mirror USx2. In this position of the diaphragm BL, light source LQx is also switched off and the light source LQy is switched on and thus through a common eyepiece a sharp image of the splicing location and movement along the x direction can be observed. From this position, the diaphragm BL can be brought into the position illustrated in dash lines and which is disposed in the path Ay of the microscope My between the lens or objective OBy in the additional or second mirror USy2. In this position, which is in dash lines, the light source LQy is switched off while the light source LQx is switched on so that a sharp image of the splicing location with movement along the y plane can be observed through the common eyepiece OK.

The adjustment of the diaphragm BL can, for example, be obtained through a suitable movement with the aid of an electromotor. Adjustment can be automatically conducted with the aid of a contact switch, which is arranged in the actuation buttons for the adjustment devices VEx and VEy which are schematically illustrated in FIG. 1. In such an instance, when the actuation of the button for the adjusting device VEy is touched, the diaphragm will then swivel into the position illustrated in dash lines and it is possible to observe the adjustment in the y direction which would correspond to FIG. 8. Correspondingly, in the case of a contacting of the actuating button for the adjustment in the device VEx, the diaphragm BL is swiveled to the position illustrated in bold lines and it is possible to observe the adjustment along the x direction corresponding to FIG. 7.

Figure 10:
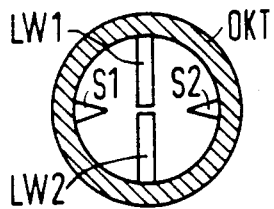
FIG. 10 is an arrangement of two tips simulating electrode tips which are provided in the intermediate image plane of the device of FIG. 9.

At the level of the intermediate plane ZE, two oppositely disposed tips are arranged to simulate the electrode tips of a fusing device. These tips S1 and S2 are mounted at the level of the intermediate plane ZE on an eyepiece body OKT for the objective OK (see FIG. 10). It can further be recognized that with the aid of the tips S1 and S2 during the adjustment it is also possible to observe which position the optical waveguides LW1 and LW2 assume in relation to the electrode tips of the fusing installation.

Although various minor modifications may be suggested by those versed in the art, it should be understood that we wish to embody within the scope of the patent granted hereon, all such modifications as reasonably and properly come within the scope of our contribution to the art.

We claim:

1. An optical device for observing the ends of optical waveguides along two directions which extend perpendicular to each other and to the axis of the waveguides as the ends are being adjusted relative to each other for splicing purposes, said device comprising two microscopes, each with an optical path, said microscopes being arranged with the optical path extending perpendicularly to each other and intersecting in an object plane, first means acting on the optical path of at least one microscope at a point spaced from the intersection point to bring the two paths of the two microscopes to a common intermediate image plane, a common eyepiece for observing the common intermediate image plane and second means for enabling alternate and separate observing of each of the two directions through the common eyepiece so that the adjustments along each of the two directions can be separately observed.

2. An optical device according to claim 1, which includes additional means disposed in at least one of the paths of the microscope between the object plane and the objective for bringing the path parallel to the path of the other microscope.

3. An optical device according to claim 2, wherein the first means is inserted in the path of the microscope between the objective and the intermediate image plane.

4. An optical device according to claim 1, wherein at the level of the intermediate image plane, two tips are disposed opposite to one another to simulate the electrode tips of a fusion splicing device.

5. An optical device according to claim 1, wherein each of the optical paths of the two microscopes has the first means for acting on the paths to bring them into the common intermediate image plane, each first means being located between an objective in the path and the common plane.

6. An optical device according to claim 5, wherein each of the optical paths of the microscopes has an additional means disposed between the object plane and the objective for bringing the paths to extend parallel to each other.

7. An optical device according to claim 6, wherein said second means includes at least one diaphragm being capable of being alternately inserted into each of the optical paths of the microscope so that while observing adjustments along one direction by one microscope, the image of the other microscope is blocked.

8. An optical device according to claim 1, wherein said second means includes at least one diaphragm capable of being alternately inserted into each of the optical paths of the two microscopes so that during observing the adjustments along one direction, the view of the other microscope is blocked.

9. An optical device according to claim 1, wherein said second means includes each microscope having a separate light source with each light source being separately actuated.

10. An optical device according to claim 9, wherein said second means further include at least one diaphragm being capable of being alternately inserted into the optical paths of each of the microscopes to coact with the light sources.

11. An optical device for observing the ends of optical waveguides, which ends are being adjusted relative to each other for splicing purposes, along two perpendicularly extending axes, said device comprising two microscopes, each microscope having an optical path and a separate light source with a switch, said microscopes being arranged with the optical paths extending perpendicularly to each other and intersecting at an intersection point in an object plane, means acting on the optical path of at least one microscope at a point spaced from the intersection point to bring the two paths of the two microscopes to a common intermediate image plane and a common eyepiece for observing the common intermediate image plane so that both adjustments along each direction can be observed and with a selective operation of the switches the observation of the adjustment along one direction will be independent of the observation of the adjustment in the other direction.

12. An optical device according to claim 11, wherein at least one diaphragm is capable of being alternately inserted into the optical paths of each of the microscopes.

* * * * *